United States Patent
Hansler et al.

(10) Patent No.: US 8,550,658 B2
(45) Date of Patent: Oct. 8, 2013

(54) LIGHT EMITTING DIODE PRECISION APPROACH PATH INDICATOR (LED PAPI)

(75) Inventors: Richard Hansler, Pepper Pike, OH (US); David L. Ruffini, Pickerington, OH (US); Edward Carome, Beachwood, OH (US); Vilnis Kubulins, Walton Hills, OH (US)

(73) Assignee: ADB Airfield Solutions, Columbus, OH (US)

( * ) Notice: Subject to any disclaimer, the term of this patent is extended or adjusted under 35 U.S.C. 154(b) by 410 days.

(21) Appl. No.: 12/949,293

(22) Filed: Nov. 18, 2010

(65) Prior Publication Data

US 2011/0285294 A1    Nov. 24, 2011

Related U.S. Application Data

(60) Provisional application No. 61/262,418, filed on Nov. 18, 2009.

(51) Int. Cl.
*B64F 1/18* (2006.01)

(52) U.S. Cl.
USPC ....... 362/231; 362/276; 362/293; 362/249.02

(58) Field of Classification Search
USPC ............ 362/249.02, 231, 555, 276, 800, 545; 340/955, 953
See application file for complete search history.

(56) References Cited

U.S. PATENT DOCUMENTS

| | | | | |
|---|---|---|---|---|
| 4,040,004 | A * | 8/1977 | Walpole | 340/956 |
| 4,170,767 | A * | 10/1979 | Tanner | 340/955 |
| 7,375,653 | B2 * | 5/2008 | Kaminski et al. | 340/955 |
| 7,755,513 | B2 * | 7/2010 | Wang et al. | 340/955 |
| 7,755,514 | B2 * | 7/2010 | Kaminski et al. | 340/955 |
| 2010/0033966 | A1 | 2/2010 | Laenen et al. | |
| 2010/0123398 | A1 | 5/2010 | Tian et al. | |

OTHER PUBLICATIONS

"Four Box, Light Emitting Diode. Precision Apprach Path Indicator (PAPI)" Version A; U.S. Department of Transportation; Jun. 16, 2009.
Advisory Circular, "Precision Approach Path Indicator (PAPI) systems", U.S. Department of Transportation; Apr. 12, 2005.

* cited by examiner

*Primary Examiner* — Anabel Ton
(74) *Attorney, Agent, or Firm* — Larry B. Donovan; Black, McCuskey, Souers & Arbaugh, L.P.A.

(57) ABSTRACT

Described herein is a LED PAPI having an array of light emitting diodes (LEDs), the array of LEDs comprising a first set of LEDs emitting a first color and a second set of LEDs emitting a second color. Light from the array of LEDs passes through a pair of apertures separated by a precision ground blade. The precision ground blade has a first edge that is closest to the array of LEDs and a second edge opposite the first edge. The first and second edges have different thicknesses. After passing through the apertures, the light passes through a first lens and a second lens.

14 Claims, 6 Drawing Sheets

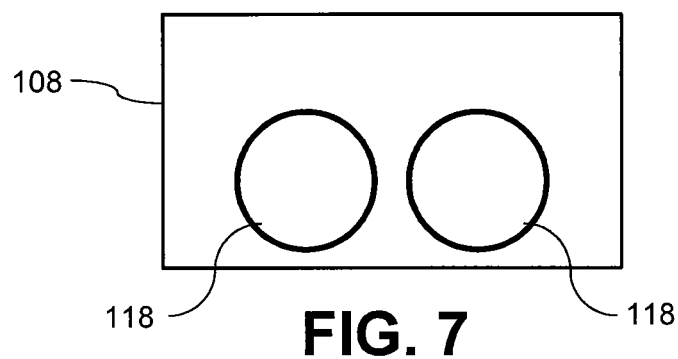
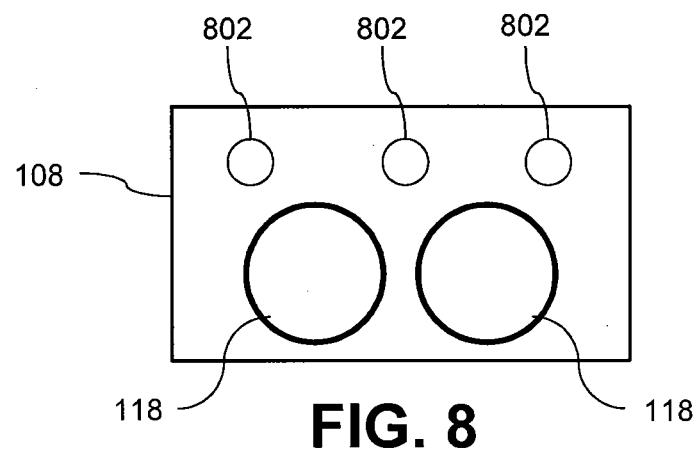

LIGHT EMITTING DIODE PRECISION APPROACH PATH INDICATOR (LED PAPI)

CROSS REFERENCE TO RELATED APPLICATIONS

This application claims the benefit of U.S. Provisional Application No. 61/262,418 filed Nov. 18, 2009.

TECHNICAL FIELD

The present disclosure relates generally to a Precision Approach Path Indicator (PAPI) implemented using Light Emitting Diodes (LEDs).

BACKGROUND

The Precision Approach Path Indicator (PAPI) system, as described in the FAA's "Precision Approach Path Indicator (PAPI) Systems" in FAA Advisory Circular AC 150/5345-28F, dated Apr. 12, 2005 provides a visual aid for pilots when landing an aircraft. The type of PAPI may be either a system consisting of 4 light units (L-880) or a system consisting of 2 light units (L-881). The light units are placed on one side of the runway in a line perpendicular to the runway centerline to define the visual glide path angle. The light units each have a white segment in an upper part of the beam and red segment in a lower part of the beam. The lights are positioned and aimed to produce a visual presentation wherein a pilot on or close to the established approach path (center) can determine his position relative of the glide path angle based on the colors of the lights as observed by the pilot.

BRIEF DESCRIPTION OF THE DRAWINGS

The accompanying drawings incorporated herein and forming a part of the specification illustrate the examples embodiments.

FIG. 7 is a front view of a first mounting surface of the LED PAPI illustrated in FIG. 1.

FIG. 8 is a front view of the first mounting surface of the LED PAPI illustrated in FIG. 1 with apertures to allow for air circulation.

OVERVIEW OF EXAMPLE EMBODIMENTS

Figure 1:
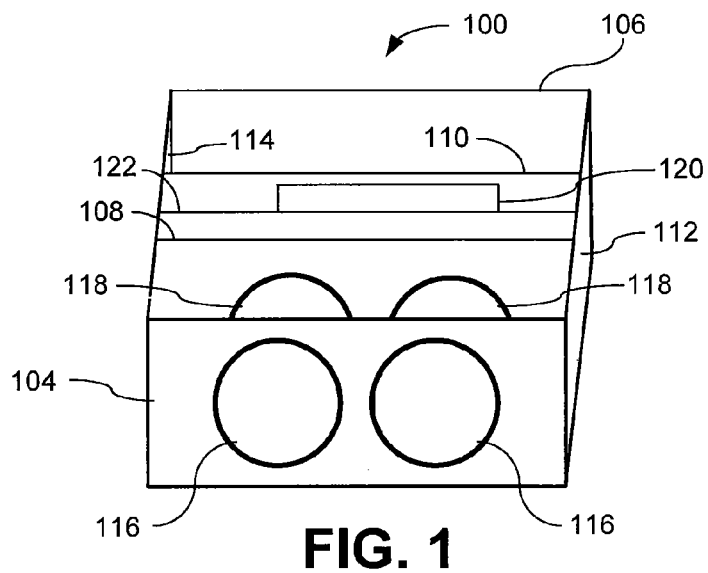
FIG. 1 illustrates a perspective view of a LED PAPI with the top cover removed.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, a PAPI that employs an array of LEDs for providing light. One set of LEDs from the array of LEDs is used to provide a white light while a second set of LEDs from the array of LEDs is used to provide a red light.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 illustrates a perspective view of an LED PAPI 100 with the top cover removed configured in accordance with an example embodiment. LED PAP 100 comprises a top surface (not shown, see for example 202 in FIG. 2), a bottom surface (not shown, see for example 204 in FIG. 2), front surface 104, rear surface 106, first mounting surface 108, second mounting surface 122, LED mounting surface 110 for mounting an array of LEDs 120, and sides 112, 114.

Lenses 116 are mounted on front surface 104. Lenses 118 are mounted on first mounting surface 108. An array of LEDs 120 is mounted on second mounting surface 112. In operation, light is emitted from array of LEDs 120, to lenses 118 and lenses 116. In an example embodiment, lenses 116 and 118 are focusing lenses and function to focus and combine light emitted from array of LEDs 120.

Figure 2:
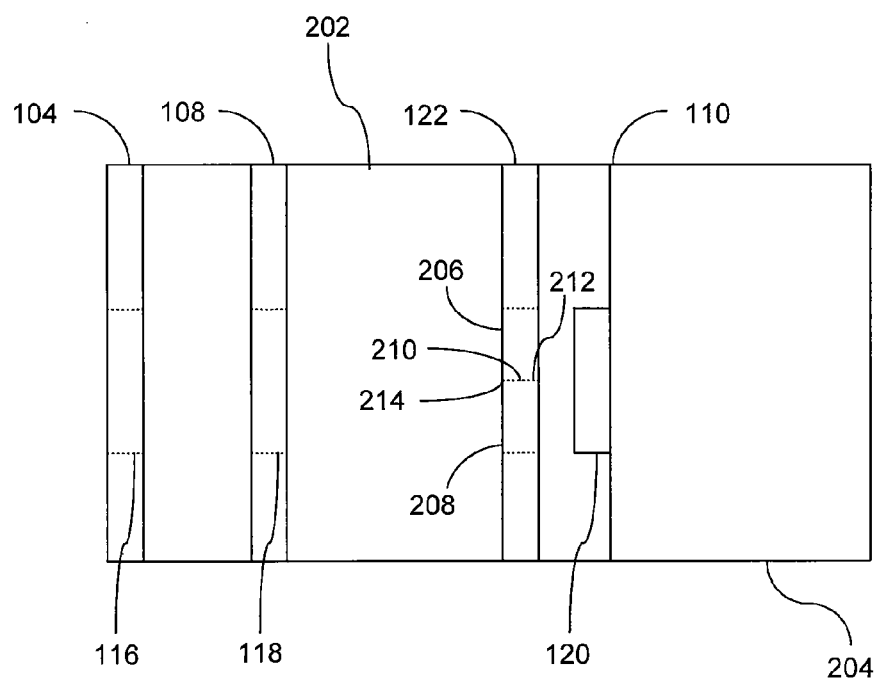
FIG. 2 is a cutaway side view of an embodiment of the LED PAPI that employs a precision ground stainless steel blade to separate different colors of light and provide a well defined transition.
Figure 3:
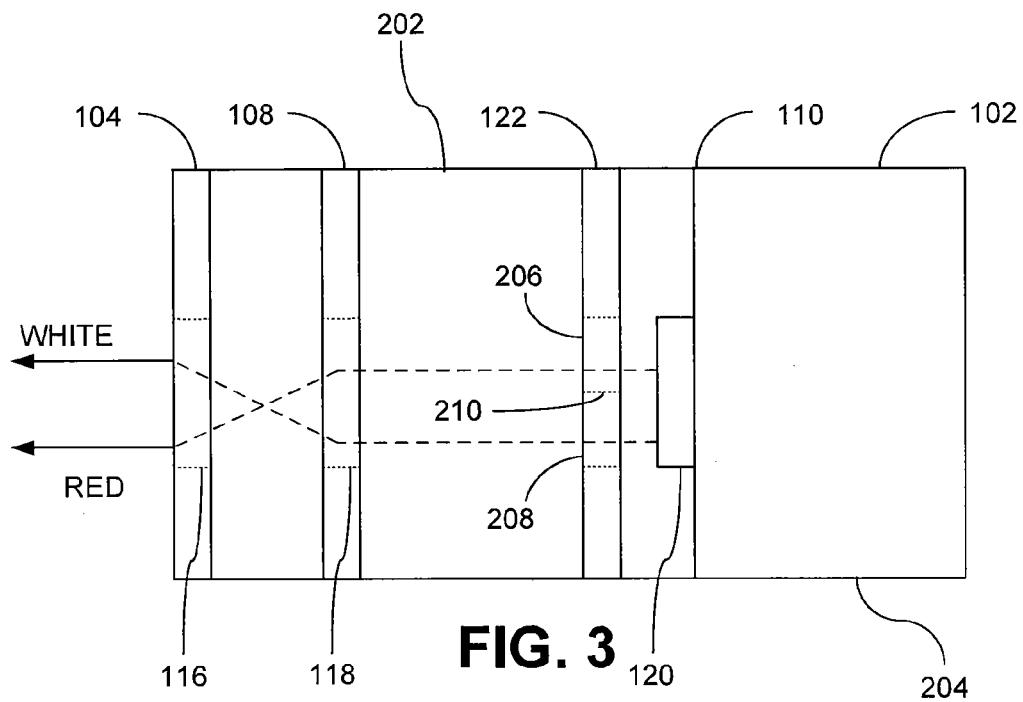
FIG. 3 is a cutaway side view of the LED PAPI in FIG. 2 illustrating light patterns.

Referring now to FIG. 2 with continued reference to FIG. 1, there is illustrated a side view of an example embodiment of a LED PAPI. In this example embodiment, sound mounting surface 122 comprises a pair of apertures 206, 208 separated by a precision ground stainless steel (or any suitable material) blade to separate different colors of light and provide a well defined transition (which may also be referred to as a "shim") 210. In particular embodiments, precision ground blade 210 may extend outside of second mounting surface 122. In an example embodiment, precision ground blade 210 is configured similar to a knife blade. For example, the edge 212 of precision ground blade 210 closest to plurality of LEDs 120 can be sixty one-thousandths of an inch ($^{60}/_{1000}$) and the edge 214 of precision ground blade 210 closest to lens 118 can be two one-thousandths of an inch ($^{2}/_{1000}$). FIG. 3 illustrates an example of the colors of the light beams from LED array 120 passing through apertures 206, 208 of second mounting surface 122. In the illustrated example, red light passes through aperture 206 and white light passes through aperture 208, lenses 118, 116 invert the light so that white light is above red light. In an example embodiment, plurality of LEDs 120 comprises a set of white LEDs (see e.g. FIG. 9) for generating the white light passing through aperture 206 and a second set of LEDs (see, e.g. FIG. 9) for generating the red light passing through aperture 210.

Figure 4:
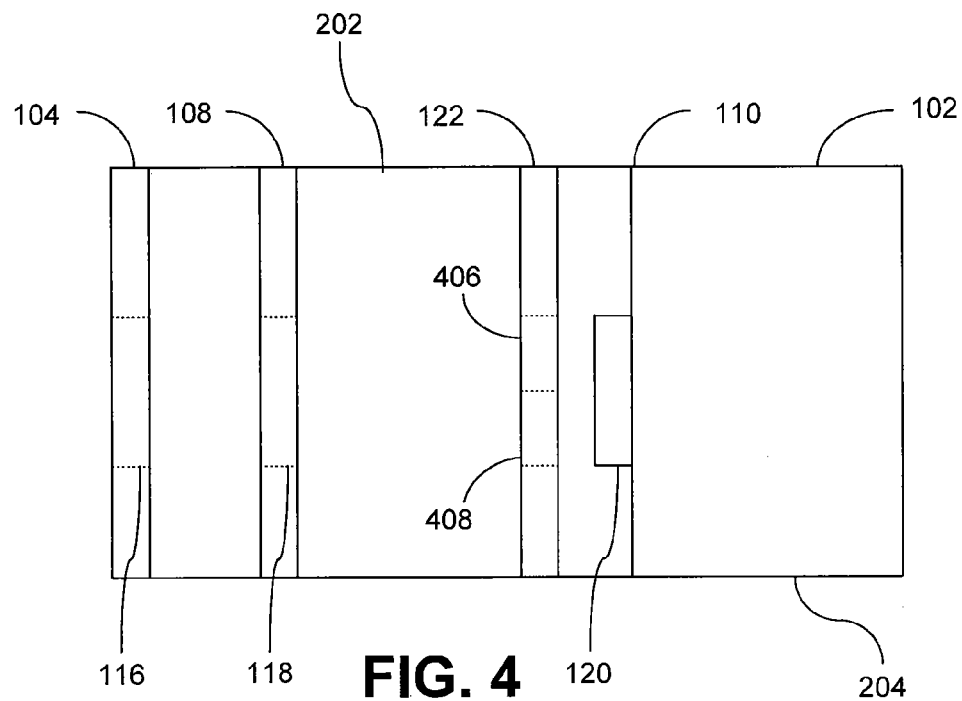
FIG. 4 is a cutaway side view of an embodiment of the LED PAPI that employs colored lenses to separate different colors of light.
Figure 5:
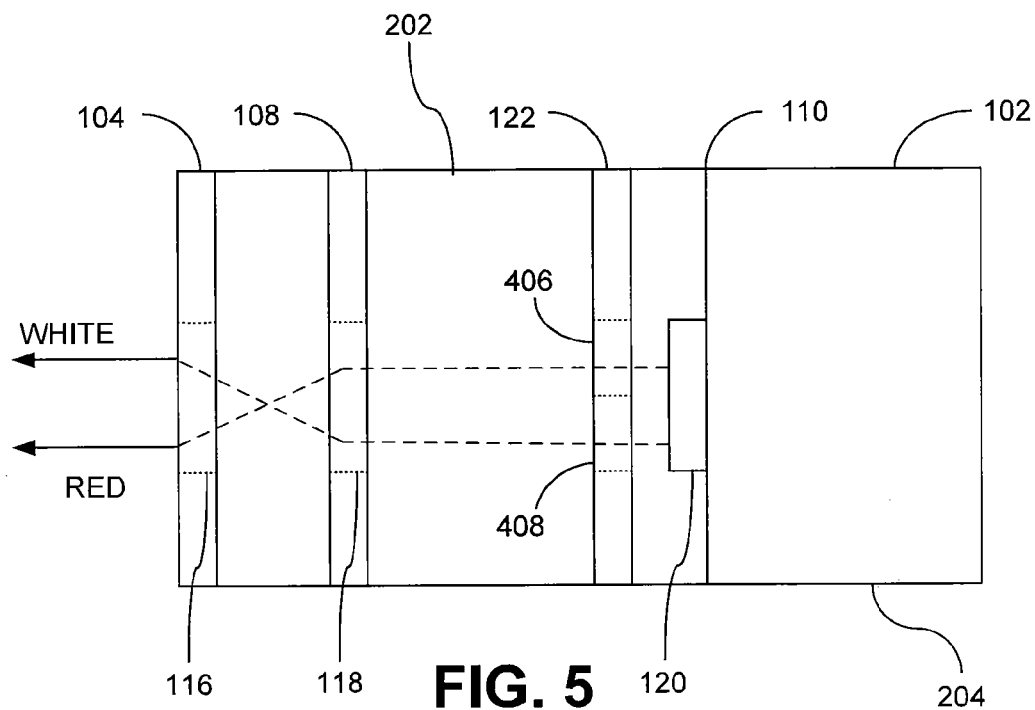
FIG. 5 is a cutaway side view of the LED PAPI in FIG. 4 illustrating light patterns.

Referring now to FIG. 4, there is illustrated a side view of an example embodiment which employ a colored filter 406 and either a clear filter or opening 408 for achieving the desired colors. In an example embodiment, all of the LEDs comprising plurality of LEDs 120 generate one color of light (e.g. white), and the desired color of light is achieved by passing the light from plurality of LEDs 120 through filter 406 and filter and/or opening 408. For example, filter 406 may be red filter for achieving a red light, and filter or opening 408 may be a clear lens filter for achieving a white light (assuming plurality of LEDs 120 is generating a white light. FIG. 5 illustrates an example where red light is transmitted from filter 406 and white light from lens 408.

Figure 6:
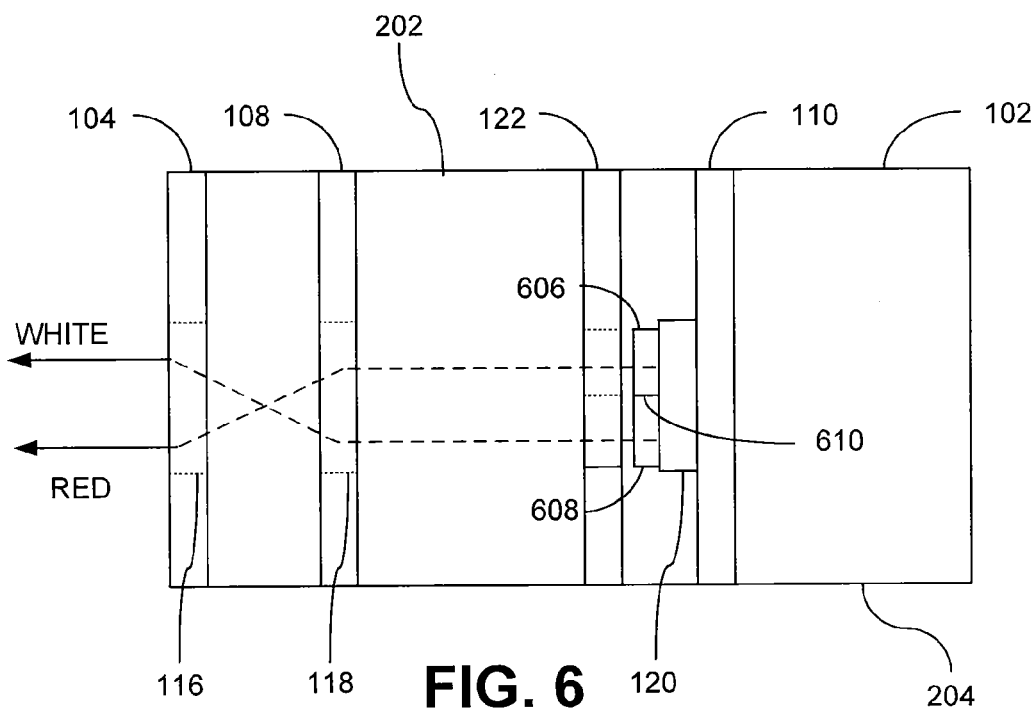
FIG. 6 illustrates a cutaway side of an LED PAPI that employs light pipes.

FIG. 6 illustrates a cutaway side of an LED PAPI that employs light pipes 606, 608. In an example embodiment, light pipes 606, 608 are acrylic rods. In particular embodiments, rods 606, 608 may have a total internal reflection surface along edge 610. In an example embodiment, rods 606, 608 are colored to provide the desired colored output. In another example embodiment, filters (such as filters 406, 408 described in FIG. 4) may be employed to achieve the desired lighting configuration. In still yet another example embodiment, plurality of LEDs 120 may suitably comprise sets of different colored LEDs to achieve the desired lighting pattern.

FIG. 7 is a front view of first mounting surface 108 in FIG. 1. In this example embodiment, a pair of lenses 118 is disposed on first mounting surface 108. The example embodiment illustrated in FIG. 8 further comprises apertures 802, which allow air to circulate.

Figure 9:
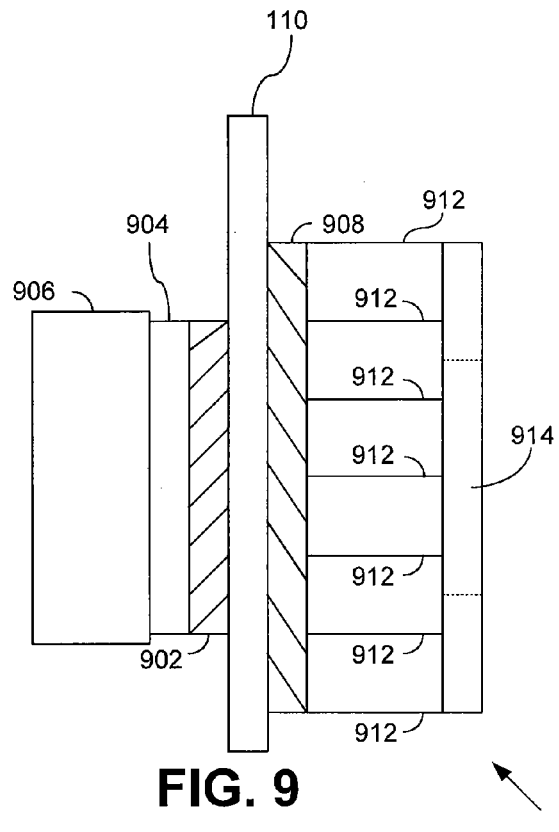
FIG. 9 is an example side view of an example embodiment for mounting an LED to the second mounting surface of the LED PAPI illustrated in FIG. 1.

FIG. 9 is an example side view of an example embodiment for mounting an LED to the LED mounting surface 110. In this embodiment, solder 902 is employed to mount LED 904 onto second mounting surface (which in an example embodiment is a copper heat conducting mounting surface) 110. In particular embodiments, a collimating lens 906 is mounted on LED 904. Collimating lens 906 can enable the light from LED 904 to be focused and may allow a lower number LEDs 904 to be employed to generate a desired luminous intensity. Mechanical fasteners (not shown) hold heat sink 910 onto LED mounting surface 110. Thermal conducting fluid is applied between mating parts. Heat sink 910 comprises a plurality of fins 912 and a fan 914. Note that the sizes of the objects illustrated in FIG. 9 have been exaggerated to ease in illustration of the example embodiment.

Figure 10:
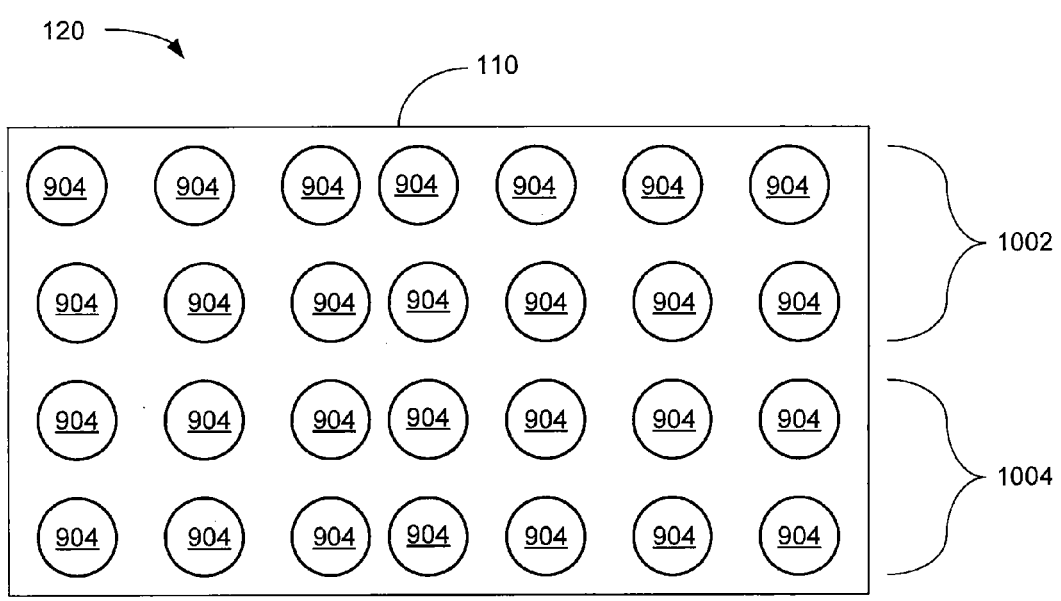
FIG. 10 is a front view illustrating a plurality of LEDs mounted on the second mounting surface of the LED PAPI illustrated in FIG. 1.

FIG. 10 is a front view illustrating a plurality of LEDs 120 mounted on the LED mounting surface 110. In the illustrated example, twenty eight (28) LEDs 904 are mounted on LED mounting surface 110. LEDs 904 may be mounted as illustrated in FIG. 9. In an example embodiment, all of LEDs 904 have the same color. In another example embodiment, a first set 1002 of LEDs 904 emit a first color of light and a second set 1004 of LEDs 904 emit a second color of light. For example, the first set 1002 of LEDs 904 may emit a red light while the second set 1004 of LEDs 1004 emit a white light.

Figure 11:
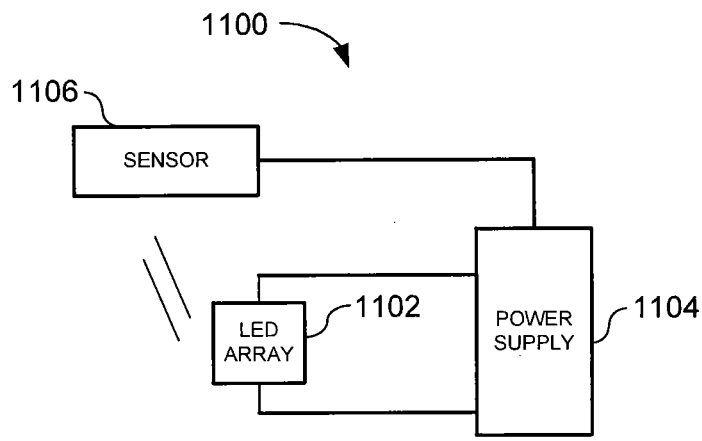
FIG. 11 is a schematic diagram of a circuit for providing power to an array of LEDs.

FIG. 11 is a schematic diagram of a circuit 1100 for providing power to an array of LEDs. In this example, LEDs array 1102 receives current from power supply 1104. Sensor 1106 receives light from LED array 1102 and determines the luminous intensity of the light, which is fed back to power supply 1104. An aspect of this example embodiment is that LED array 1102 can be operated at the minimum amount of current to achieve the desired luminous intensity, as opposed to operating the LEDs at full intensity, which can extend the life of LEDs in LED array 1102 and save energy. As the LEDs in LED array 1102 age and lose intensity, sensor 1106 detects the change of luminous intensity which is fed back to power supply 1104 and power supply 1104 adjusts the current provided to LED array 1102 accordingly.

Figure 12:
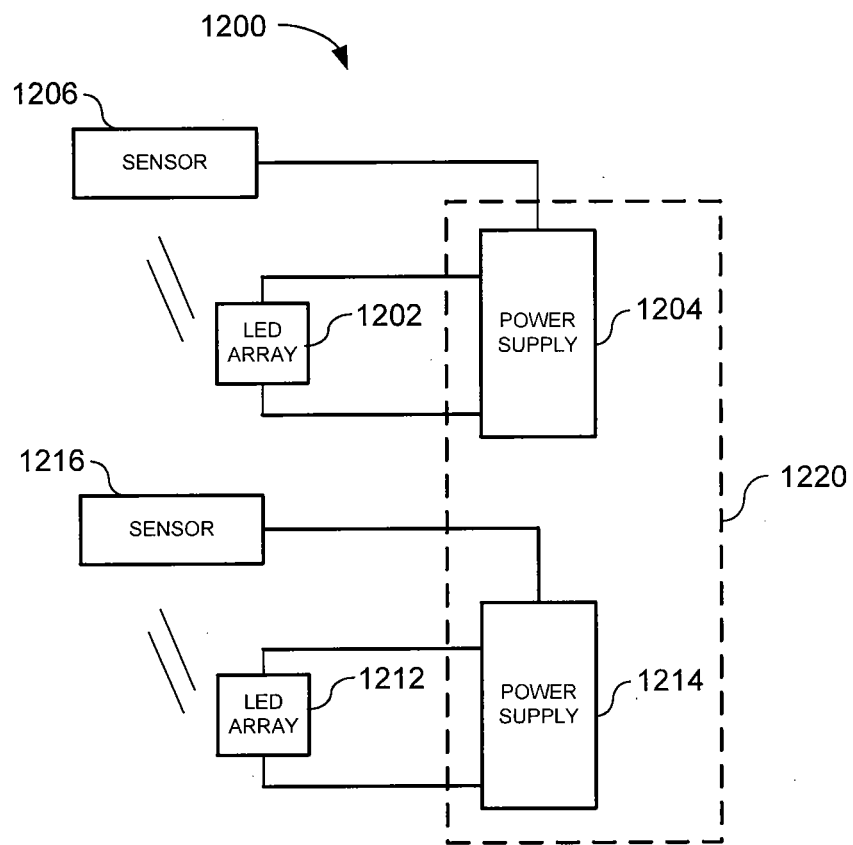
FIG. 12 is a schematic diagram of a circuit for providing power to an array of LEDs where different power supplies provide power to different sets of LEDs in the array.

FIG. 12 is a schematic diagram of a circuit 1200 for providing power to an array of LEDs where different power supplies provide power to different sets of LEDs in the array. In this example, a first LEDs array 1202 receives current from a first power supply 1204. First sensor 1206 receives light from first LED array 1202 and determines the luminous intensity of the light, which is fed back to power supply 1204, which can adjust the current provided to first LED array 1202 to achieve a desired luminous intensity.

A second LEDs array 1212 receives current from a second power supply 1214. Second sensor 1216 receives light from second LED array 1212 and determines the luminous intensity of the light, which is fed back to power supply 1214, which can adjust the current provided to first LED array 1202 to achieve a desired luminous intensity. Although the illustrated example shows multiple power supplies, those skilled in the art can readily appreciate that a single power supply with multiple outputs may also be employed as represented by 1220.

LEDs of different colors (such as white and red in a PAPI), may require different current levels to achieve the same luminous intensity. An aspect of the example embodiment of FIG. 12 is that each set of LEDs can be provided with a separate power to provide the minimum amount of current to each set of LEDs to achieve the desired luminous intensity. Thus, LEDs having different colors and/or different luminous intensities for the same current can be operated at the same luminous intensity.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a first mounting surface for mounting an array of light emitting diodes, the array of light emitting diodes comprising a first set of light emitting diodes emitting a first color and a second set of light emitting diodes emitting a second color;
a second mounting surface having a pair of apertures optically coupled with the array of light emitting diodes, the pair of apertures are separated by a precision ground blade, wherein the precision ground blade has a first edge and a second edge, the first edge is closest to the array of light emitting diodes and the second edge is opposite the first edge, the first and second edges having different thicknesses;
a third mounting surface having a first lens mounted thereon, the first lens optically coupled with the array of light emitting diodes and receiving light from the array of light emitting diodes; and a front surface having a second lens mounted thereon, the second lens optically coupled with the first lens and receiving light from the first lens.

2. The apparatus of claim 1, wherein the first edge of the precision ground blade is sixty one thousandths of an inch and the second edge of the precision ground blade is two one thousandths of an inch.

3. The apparatus of claim 1, wherein the first set of light emitting diodes is on top of the second set of light emitting diodes, the first set of light emitting diodes emit red light and the second set of light emitting diodes emit white light.

4. The apparatus of claim 3, further comprising a first light pipe optically coupled with the first set of light emitting diodes and a second light pipe optically coupled with the second set of light emitting diodes.

5. The apparatus of claim 4, further comprising a collimating lens optically coupled with each light emitting diode.

6. The apparatus of claim 5, further comprising a first light pipe optically coupled with the first set of light emitting diodes and a second light pipe optically coupled with the second set of light emitting diodes.

7. The apparatus of claim 4, further comprising a mounting surface for each light emitting diode of the array of diodes; and wherein each diode is coupled with its corresponding mounting surface with solder.

8. The apparatus of claim 7, further comprising a heat sink coupled with the mounting surface; and wherein a thermal epoxy couples the heat sink with the mounting surface.

9. The apparatus of claim 1, further comprising:
a power supply coupled with the array of light emitting diodes, the power supply provides power to the array of light emitting diodes; and
a sensor coupled with the power supply, the sensor receiving light from the array of light emitting diodes and providing data representative of luminous intensity to the power supply;
wherein the power supply provides a minimal amount of power to the array of light emitting diodes to achieve a desired luminous intensity as measured by the sensor.

10. The apparatus of claim 1, further comprising:
a first power supply coupled with the first set of light emitting diodes, the first power supply providing power to the first set of light emitting diodes;
a first sensor coupled with the first power supply, the first sensor receives light from the first set of light emitting diodes and provides data representative of luminous intensity of light received from the first set of light emitting diodes to the first power supply;
wherein the first power supply provides a minimal amount of power to the first set of light emitting diodes to achieve a desired luminous intensity as measured by the first sensor;
a second power supply coupled with the second set of light emitting diodes, the second power supply providing power to the second set of light emitting diodes;
a second sensor coupled with the second power supply, the second sensor receives light from the second set of light emitting diodes and provides data representative of luminous intensity of light received from the second set of light emitting diodes to the second power supply;
wherein the second power supply provides a minimal amount of power to the second set of light emitting diodes to achieve a desired luminous intensity as measured by the second sensor.

11. An apparatus, comprising:
a first mounting surface for mounting an array of light emitting diodes, the array of light emitting diodes comprising a first set of light emitting diodes emitting a first color and a second set of light emitting diodes emitting a second color;
a second mounting surface having a pair of filters mounted thereon, a first of the pair of filters is optically coupled with the first set of light emitting diodes and a second of the pair of filters is coupled with the second set of light emitting diodes;
a third mounting surface having a first lens mounted thereon, the first lens optically coupled with the array of light emitting diodes and receiving light from the array of light emitting diodes; and
a front surface having a second lens mounted thereon, the second lens optically coupled with the first lens and receiving light from the first lens.

12. The apparatus of claim 11, wherein the first set of light emitting diodes is mounted on top of the second set of light emitting diodes.

13. The apparatus of claim 11, wherein the first color is red and the second color is white.

14. The apparatus of claim 13, wherein the first filter is red and the second filter is clear.

* * * * *